US009098945B2

(12) United States Patent
Wang et al.

(10) Patent No.: US 9,098,945 B2
(45) Date of Patent: Aug. 4, 2015

(54) MODELING ANISOTROPIC SURFACE REFLECTANCE WITH MICROFACET SYNTHESIS

(75) Inventors: Jiaping Wang, Beijing (CN); Shuang Zhao, Beijing (CN); Xin Tong, Beijing (CN); John M. Snyder, Redmond, WA (US); Baining Guo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1054 days.

(21) Appl. No.: 12/433,910

(22) Filed: May 1, 2009

(65) Prior Publication Data

US 2010/0277477 A1 Nov. 4, 2010

(51) Int. Cl.
*G06T 15/50* (2011.01)

(52) U.S. Cl.
CPC ................................ *G06T 15/506* (2013.01)

(58) Field of Classification Search
CPC ......... G06T 15/50; G06T 15/80; G01N 21/47
See application file for complete search history.

(56) References Cited

U.S. PATENT DOCUMENTS

| 6,246,416 | B1 * | 6/2001 | Stam | 345/426 |
|---|---|---|---|---|
| 6,765,573 | B2 | 7/2004 | Kouadio | |
| 6,987,568 | B2 | 1/2006 | Dana | |
| 7,079,137 | B2 * | 7/2006 | Borshukov | 345/426 |
| 7,119,903 | B1 * | 10/2006 | Jones | 356/446 |
| 7,256,781 | B2 * | 8/2007 | Shioya | 345/426 |
| 8,509,552 | B1 * | 8/2013 | Biswas et al. | 382/236 |
| 2002/0080136 | A1 * | 6/2002 | Kouadio | 345/426 |
| 2002/0130866 | A1 * | 9/2002 | Stuttard | 345/426 |
| 2003/0128207 | A1 * | 7/2003 | Sawada | 345/419 |
| 2003/0164838 | A1 * | 9/2003 | Guo et al. | 345/582 |
| 2004/0036882 | A1 * | 2/2004 | Perlin | 356/446 |
| 2004/0236742 | A1 * | 11/2004 | Ogura et al. | 707/6 |
| 2005/0146539 | A1 * | 7/2005 | Zhu et al. | 345/639 |
| 2005/0275652 | A1 * | 12/2005 | Keller | 345/419 |
| 2006/0227137 | A1 | 10/2006 | Weyrich et al. | |
| 2006/0285755 | A1 * | 12/2006 | Hager et al. | 382/224 |
| 2007/0124122 | A1 * | 5/2007 | Freier | 703/2 |
| 2007/0211069 | A1 * | 9/2007 | Baker et al. | 345/587 |
| 2007/0216905 | A1 | 9/2007 | Han et al. | |
| 2007/0250476 | A1 * | 10/2007 | Krasnik | 707/2 |
| 2008/0122836 | A1 * | 5/2008 | Van Horn et al. | 345/419 |
| 2008/0306719 | A1 * | 12/2008 | Freier | 703/13 |

(Continued)

OTHER PUBLICATIONS

Experimental Analysis of BRDF Models, Ngan et al., 2005.*

(Continued)

*Primary Examiner* — David Zarka
*Assistant Examiner* — Phong Nguyen
(74) *Attorney, Agent, or Firm* — Dan Choi; Peter Taylor; Micky Minhas

(57) ABSTRACT

Described is a search technology in which spatially varying anisotropic reflectance is modeled using image data captured from a single view. Reflectance at each point is represented using a microfacet-based Bidirectional Reflectance Distribution Function (BRDF). Modeling processes the image data, which provides a partial normal distribution function (NDF) for each surface point. The NDF at each selected point is completed by texture synthesis using similar, overlapping partial NDFs from other points. Also described is a scanning device that illuminates a sample surface from a two-dimensional set of light directions using a linear array of LEDs moved over a flat sample.

20 Claims, 8 Drawing Sheets

(56) References Cited

U.S. PATENT DOCUMENTS

| | | | |
|---|---|---|---|
| 2009/0006052 A1 | 1/2009 | Zhou et al. | |
| 2009/0138236 A1* | 5/2009 | Tsai | 702/179 |
| 2011/0243417 A1* | 10/2011 | Madabhushi et al. | 382/131 |

OTHER PUBLICATIONS

Linear Light Source Reflectometry, Gardner et al., 2003.*
Progressive Searching of Biological Sequences, Kahveci et al., 2004.*
Compact in-line interferometer for low-coherence reflectometry, Schmitt, 1995.*
Example-Based Photometric Stereo: Shape Reconstruction with General, Varying BRDFs, Hertzmann et al., 2005.*
Distribution-based BRDFs, Ashikhmin et al., 2007.*
Texture Synthesis by Non-parametric Sampling, Efros et al., 1999.*
Models of Light Reflection for Computer Synthesized Pictures, Blinn, 1977.*
Non-Linear Approximation of Reflectance Functions, Lafortune et al., 1997.*
Image-based BRDF Acquisition for Non-spherical Objects, Wu et al., 2005.*
An Optimal Algorithm for Approximate Nearest Neighbor Searching in Fixed Dimensions, Arya et al., 1999.*
BRDF-Shop: Creating Physically Correct Bidirectional Reflectance Distribution Functions, Colbert et al., 2006.*
Appearance based object modeling using texture database: Acquisition, compression and rendering, Furukawa et al., 2002.*
Practical Modeling and Acquisition of Layered Facial Reflectance, Ghosh et al., 2008.*
Image-Based Reconstruction of Spatially Varying Materials, Lensch et al., 2001.*
Real-Time Texture Synthesis by Patch-Based Sampling, Liang et al., 2001.*
Koudelka, et al., "Image-based Modeling and Rendering of Surfaces with Arbitrary BRDFs", retrieved at <<http://citeseerx.ist.psu.edu/viewdoc/download;jsessionid=5793EDC3EB 178235D2BED26932BFB53A?doi=10.1.1.4.1492&rep=rep1 &type=pdf>>, pp. 1-8.
Ashikhmin, et al., "Distribution-based BRDFs", retrieved at <<http://www.cs.utah.edu/~premoze/dbrdf/dBRDF.pdf>>, pp. 10.
Kelemena, et al., "A Microfacet based Coupled Specular-Matte BRDF Model with Importance Sampling", retrieved at www.fsz.bme.hu/~szirmay/scook.pdf>>, The Eurographics Association 2001, pp. 11.
Wang, et al., ""Modeling Anisotropic Surface Reflectance with Example-based Microfacet Synthesis"", retrieved at <<http://delivery.acm.org/10.1145/1370000/1360640/a41-wang.pdf?key1=1360640&key2=2869162321&coll=GUIDE &dl=GUIDE&CFID=19205943&CFTOKEN=32910506>>, ACM Transactions on Graphics, vol. 27, No. 3, Article 41, Publication date: Aug. 2008, pp. 10.

* cited by examiner

MODELING ANISOTROPIC SURFACE REFLECTANCE WITH MICROFACET SYNTHESIS

BACKGROUND

The physical world contains many complex materials whose reflectance properties need to be modeled or captured to produce realistic computer graphics imagery. The effects of spatial variation and anisotropy of such materials can be represented by the six-dimensional Spatially Varying Bidirectional Reflectance Distribution Function (SVBRDF), but are particularly challenging to reproduce. Traditional approaches represent the BRDF (Bidirectional Reflectance Distribution Function) at each surface point using parametric models.

Simple parametric models are unable to realistically capture the reflectance properties of many real-world materials. More complicated, multi-lobe models may represent any BRDF to an arbitrary accuracy, but their many parameters are very difficult to specify and control.

As a result, SVBRDF measurement systems have been employed to measure six-dimensional SVBRDFs directly from surface samples. However, the high dimensionality of SVBRDFs necessitates lengthy capture processes, using expensive devices that densely scan the light and view directions, and are thus impractical for many applications. Alternatively, brute-force acquisition techniques may be employed, but they also require precise calibration of multiple and/or moving cameras, adding to the cost and fragility of such measurement systems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a set of images are captured and processed to perform surface modeling, in which each image of the set is captured (e.g., from a single view) while being illuminated from a different illumination position with respect to the sample surface. The images are processed into partial normal distribution functions corresponding to points of the sample surface. At least some of those normal distribution functions/points are selected and completed into completed normal distribution functions based upon other partial normal distribution functions corresponding to other points. The completed normal distribution function at each point is used to obtain a bidirectional reflectance distribution function, e.g., by using the completed normal distribution function to compute a specular coefficient and shadowing term, and estimating a relative refraction index, thereby providing SVBRDFs.

In one aspect, the illumination positions are changed among different illumination positions in two dimensions by a scanning mechanism. One suitable scanning mechanism includes a linear array of light sources (e.g., LEDs) that are individually illuminated in one direction (e.g., along the Y-axis with respect to the sample). A motor moves the linear array in another direction, (e.g., along the X-axis with respect to the sample), thereby providing the different illumination positions in two dimensions.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a process and mechanism for visually modeling spatially varying anisotropic reflectance using data captured from a single view (camera). To this end, reflectance is represented using a microfacet-based Bidirectional Reflectance Distribution Function (BRDF) that tabulates the facets' normal distribution function (NDF) as a function of surface location. Data from a single view provides a two-dimensional slice of the four-dimensional BRDF at each surface point, from which a partial NDF is fitted; (note that the fitted NDF is partial because the single view direction coupled with the set of light directions covers only a portion of the "half-angle" hemisphere, as described below). The NDFs (or representative NDFs) are completed by applying texture synthesis at each point using similar, overlapping partial NDFs from other points.

While various examples are described herein, it should be understood that any of the examples described herein are non-limiting examples. For example, a certain implementation is described that captures the data, however many variations of such an implementation are feasible, e.g., with different light sources, more than one camera (although having one view is advantageous), and so forth. Indeed any suitable mechanism for capturing the data may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computer-based modeling in general.

Figure 1:
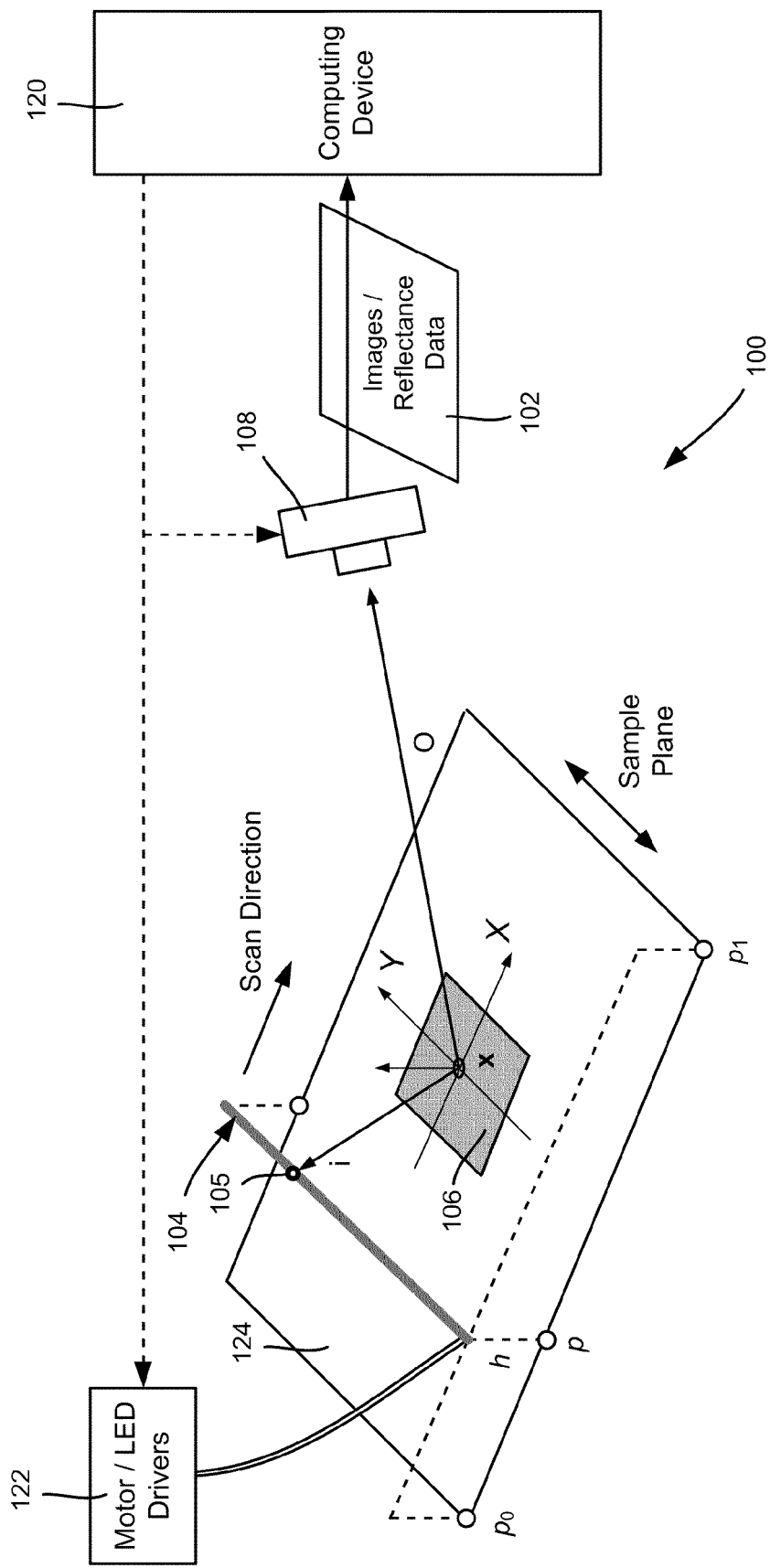
FIG. 1 is a block diagram showing an example scanning mechanism for capturing images of a sample surface illuminated from different lighting positions in two dimensions at a single view for use in modeling the reflectance of that sample surface.

FIG. 1 shows a reflectance data acquisition device 100 that collects a set of images (including the reflectance data therein) 102 over a two-dimensional set of light directions by scanning a linear array 104 of LEDs (one LED 105 is explicitly illustrated) over a relatively flat surface sample 106. The individually illuminated LEDs along with the scanning that moves the linear array 104 illuminates the surface sample 106 from different directions, whereby the set of different images may be acquired by capturing each image's reflectance data from a single view, that is, the camera 108. Note that it is feasible to have more than one view captured per illumination, however this adds additional complexity in processing. The images 102 are processed by a suitable computing device 120 (e.g., a computer system) to obtain the desired reflectance data as described herein. Further note that FIG. 1 shows the computing device 120 controlling a scanning motor/LED drivers (block 122) in conjunction with triggering the camera 108, however it is understood that any suitable synchronization mechanism may be used.

In one implementation, the linear array 104 is mounted above the flat sample 106 and controlled by a stepping motor. A typical dimension of the surface sample 106 is 10 cm×10 cm. In this implementation, the linear array 104 comprises forty LEDs, with the distance between neighboring LEDs being 0.6 cm. The step length may be equal to the LED separation size, but this is not a requirement. The camera 108 is a commercially available device set with an image resolution of 3504×2336 pixels, and is configured with EF-100 2.8 lens placed approximately 1.0 meter away and 0.6 meters above the center of the surface sample, making an angle of roughly θ=60° from vertical.

Before capturing, the camera's position and orientation are calibrated; a colored checker pattern (not explicitly shown) on the underlying surface plane 124 may be used to calibrate the color and intensity of each LED. After geometric and photometric calibration, the flat material sample 106 is placed onto the XY plane, generally centered at the origin. Based on the size and thickness of the material sample, the height h of the LED array 104 above the sample plane may be adjusted, however a typical value is 4 cm. The LED array 104 moves from a starting position $p_0$, generally as far as possible away from the sample 106, and translated over the sample 106 in the scan direction shown in FIG. 1, that is, towards the stop position, $p_1$. Alternatively, the scan may be performed in the opposite direction, and similarly, the LEDs may be illuminated in any direction and/or even in another illumination pattern, as long as the scan direction and/or illumination pattern are known to the computing device 120 so that each illumination position can be matched to its corresponding image.

For each LED position, images of different exposures are taken to reconstruct a high dynamic range (HDR) image. In the exemplified direction, the scan is completed when the LED array 104 reaches $p_1$, generally where the LED array 104 starts to occlude the sample 106 from the camera's view. The result is a sequence of images $I_q(x)$ where the subscript $q \in \{1,2,\ldots,n\}$ indicates a different point light source (i.e., a different LED with different Y translation). The positions $p_0$ and $p_1$ are measured so that the light source positions can be recovered.

Figure 2:
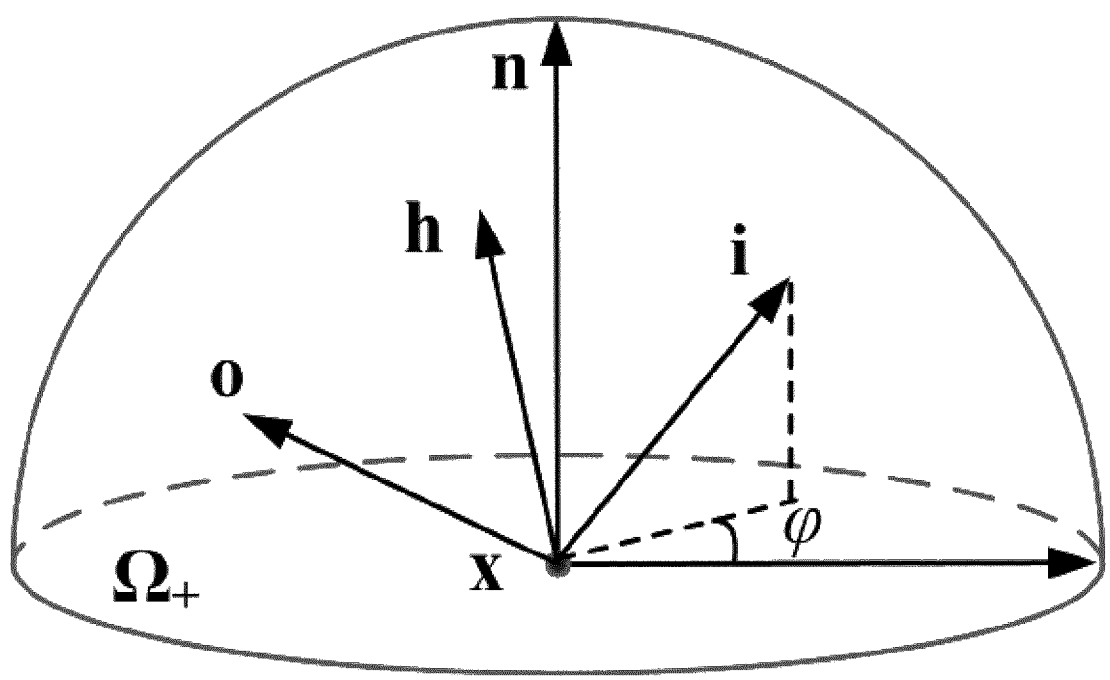
FIG. 2 is a representation illustrating various aspects of microfacet modeling.

Microfacet theory represents surface microstructure with a large number of tiny mirror facets, each purely reflective and having the same refraction index. FIG. 2 and the following table illustrate and describe various symbols used in the BRDF definition:

| | |
|---|---|
| x | Surface point |
| i | Lighting direction |
| o | Viewing direction |
| h | Half-angle vector |
| n | Upward normal direction |
| ρ(x, i, o) | BRDF at surface point x |
| F(x, i, o) | Fresnel term |
| D(x, h) | Microfacet Normal Distribution Function |
| S(x, k) | Shadowing term |
| W(x, h) | Confidence function |
| $\Omega_+$ | Hemisphere of $\{h | h \cdot n > 0\}$ |
| Ψ(x) | Partial NDF tuple |
| Ψ* | Exemplar set |
| Ω | Domain covered by partial NDF tuple |
| $\Omega_\cap$ | Overlap region of two partial NDF tuples |

The BRDF ρ(x,i,o) at a surface point x can be decomposed into a specular part and a diffuse part:

$$\rho(x,i,o) = \rho_d(x,i,o) + k_s(x)\rho_s(x,i,o) \quad (1)$$

where $\rho_d(x,i,o)$ is the diffuse part resulting from subsurface scattering and multiple-bounce reflections, $\rho_s(x,i,o)$ is the specular part due to single-bounce reflections, and $k_s(x)$ controls the diffuse-to-specular ratio. The diffuse part may be modeled with the known Lambertian model $\rho_d(x,i,o) = k_d(x)/\pi$.

Assuming the microfacets form a height field, the specular term is given by:

$$\rho_s(x, o, i) = \frac{D(x, h)G(x, o, i)F(x, o, i)}{4(i \cdot n)(o \cdot n)} \quad (2)$$

where h=(o+i)/|o+i| is the half-angle vector, and n is the upward surface normal at x. Note that for a flat sample, n=(0,0,1). As set forth in the above table, the model comprises three spatially-varying components, namely the Fresnel term F, the microfacet Normal Distribution Function (NDF) D, and the shadowing-masking term G.

The Fresnel term F(x,o,i) affects the specular shape near grazing angles, and is given by:

$$F(x, o, i) = \frac{(g-c)^2}{2(g+c)^2}\left(1 + \frac{(c(g+c)-1)^2}{(c(g-c)+1)^2}\right) \quad (3)$$

for unpolarized light. Here $g^2 = \eta(x)^2 + c^2 - 1$ and $c = |i \cdot h|$ where η(x) denotes the relative refraction index at surface location x.

The NDF (normal distribution function) D(x,h) describes the distribution of microfacet orientations on the surface. It satisfies $D(x,h) \geq 0$ and $\int_{\Omega_+}(n \cdot h)D(x,h)d\omega_h = 1$ where the integration is done in half-angle space over the hemisphere $\Omega_+ = \Omega_+(n) = \{h | h \cdot n > 0\}$. High-frequency characteristics of surface reflectance such as glossiness and anisotropy are dominated by D(x,h), so no assumptions are made, and it is represented in tabular form.

G(x,o,i) represents the shadowing and masking effects of microfacets on both incoming and outgoing light. It can be approximately decomposed into the product of two directional shadowing terms S:

$$G(x,o,i) = S(x,i)S(x,o) \quad (4)$$

A known derivation may be used to compute the shadowing term S(x,k) for a given direction k from the NDF D(x,h) via $$S(x, k) = \frac{(k \cdot n)}{\int_{\Omega_+(k) \cap \Omega_+(n)} (h \cdot k) D(x, h) \, d\omega_h} \quad (5)$$

The shadowing term is smooth, which is used in partial NDF recovery (as described below) to constrain the shadowing term. The full SVBRDF model is therefore:

$$\rho(x, o, i) = \frac{k_d(x)}{\pi} + k_s(x) \frac{D(x, h) S(x, i) S(x, o) F(x, o, i)}{4(i \cdot n)(o \cdot n)} \quad (6)$$

and is represented by four quantities: an NDF D, a scalar Fresnel refraction index $\eta$, and scalar specular and diffuse coefficients, $k_d$ and $k_s$. Each is a function of surface location x.

Given the SVBRDF, outgoing radiance L(x,o) at each point x can be computed by the rendering equation as $$L(x,o) = \int_{\Omega_i} \rho(x,i,o)(i \cdot n) L(x,i) d\omega_i \quad (7)$$

where L(x,i) is the incoming radiance from direction i.

One implementation parameterizes direction space with a hemicube, typically subdivided into 32×32 cells on the top face and 32×16 cells on each side. For more specular materials such as aluminum, the hemicube may be divided more finely. Note that "direction space" refers to half-angle directions h for the NDF, and light directions i for the two-dimensional BRDF slice for a single view direction, o.

After capturing, the HDR images are reconstructed and rectified. As described below, a BRDF sample at each surface point x can then be computed from the image sequence $I_q$, as $$\rho(x, i_q(x), o(x)) = \frac{I_q(x)}{(n \cdot i_q(x)) L_q \| P_q - x \|^2} \quad (8)$$

where $P_q$ is the position of the light source in image q and $L_q$ is its intensity. The lighting direction i is computed as $i_q(x) = (P_q - x)/\| P_q - x \|$. Because the camera 108 is relatively far from the sample 106, the viewing direction at the sample center is used for the surface points, $o = V/\|V\|$, where V is the calibrated camera position.

The diffuse components are separated from the specular components using:

$$\rho_d(x) = \min_q \{\rho(x, i_q(x), o) \mid I_q(x) > 0.05 I_{avg}\} \quad (9)$$

where $\rho(x,i_q(x),o) = I_q(x)/(I_q(x) \cdot n)$. Intensity measurements below five percent of average $I_{avg}$ tend to be noisy and unreliable, and in one implementation are removed. After separation the scaled specular measurement $\tilde{\rho}_s(x,i_q(x),o) = \rho(x,i_q(x), o) - \rho_d(x) = k_s(x)\rho_s(x,i_q(x),o)$ is obtained at densely-sampled lighting directions. These scattered measurements are interpolated with a known push-pull method, yielding a two-dimensional slice of the specular component $\tilde{\rho}_s(x,i,o)$ that is uniformly sampled over the hemicube of incident lighting directions i. A next phase uses $\tilde{\rho}_s$ to fit the NDF and the BRDF model's other parameters.

Note that it is possible that a single view can fail to provide enough exemplars for NDF synthesis, if there is insufficient spatial redundancy or local frame variation over the material sample. An example is brushed metal whose brush direction is constant over the entire sample. Such cases can be addressed by capturing image sequences for different rotations of the sample. BRDF slices from these different rotations can then be put together as if they were captured from a larger sample in a single pass.

Figure 3:
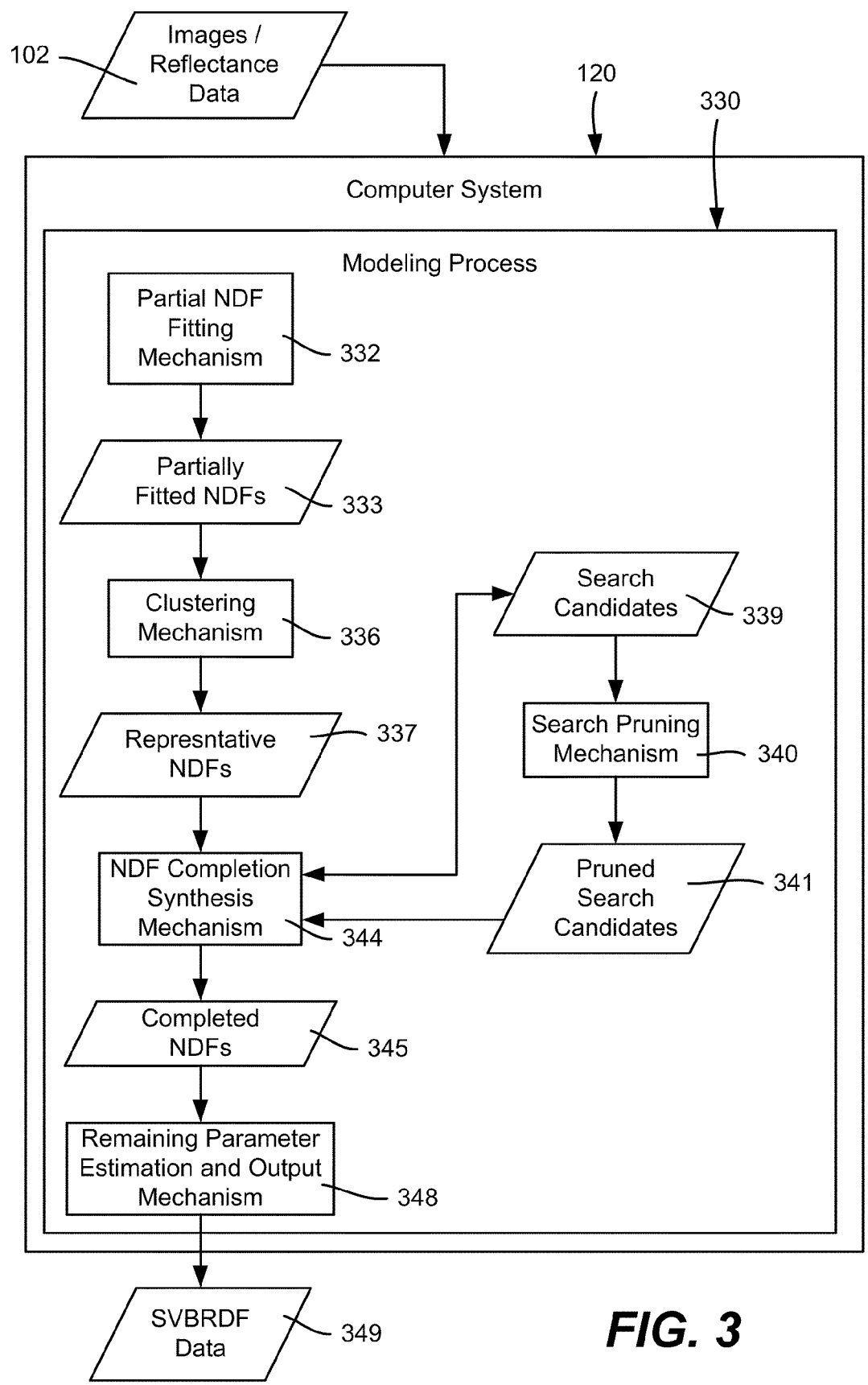
FIG. 3 is a block diagram showing example components of a modeling process for modeling the reflectance of a sample surface.
Figure 4:
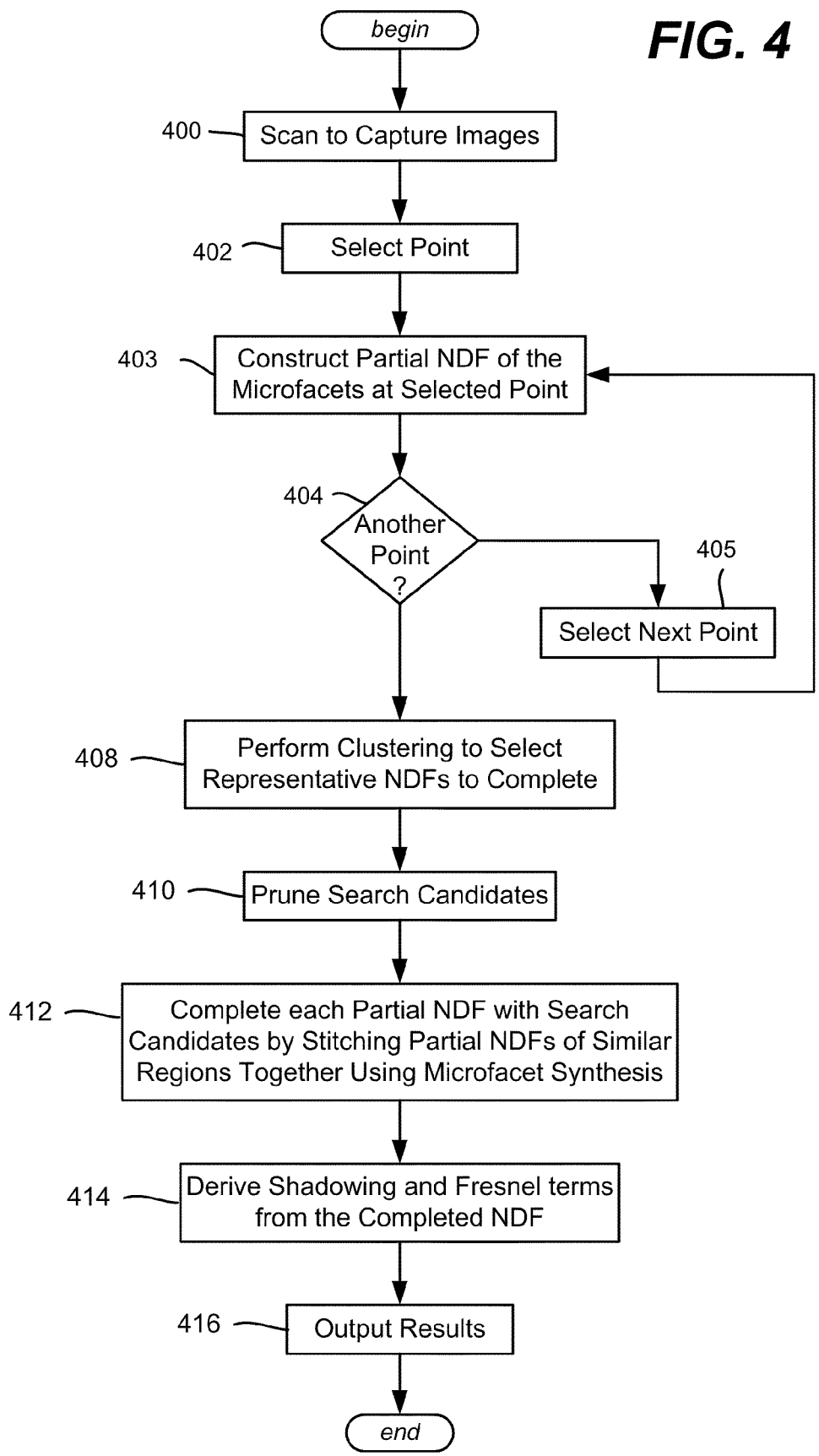
FIG. 4 is a flow diagram showing example steps of a modeling process for modeling the reflectance of a sample surface.

Turning to example-based microfacet synthesis, FIGS. 3 and 4 show various example mechanisms and steps by which the surface's SVBRDF may be modeled by a modeling process 330 using the captured two-dimensional BRDF data at each surface point via the images 102. In general, the mechanisms are described with reference to FIG. 3 and are labeled 3xx, while the steps are described with reference to FIG. 4 and are labeled 4xx, beginning at step 400 which represents performing the scan.

A first operation represented by block 332 (FIG. 3) and steps 402-405 (FIG. 4) constructs the partial NDF of the microfacets at each point. The NDF is partial because the single view direction generates half-angle reflected directions covering only a portion of the hemisphere. In another step (block 334 and step 412), microfacet synthesis completes the partial NDF by "stitching" partial NDFs of similar regions together. In a later step (block 348 and step 414), the shadowing and Fresnel terms are derived from the completed NDFs 345. With this information, the SVBRDF data 349 or other appropriate results are output (step 416).

Figure 5:
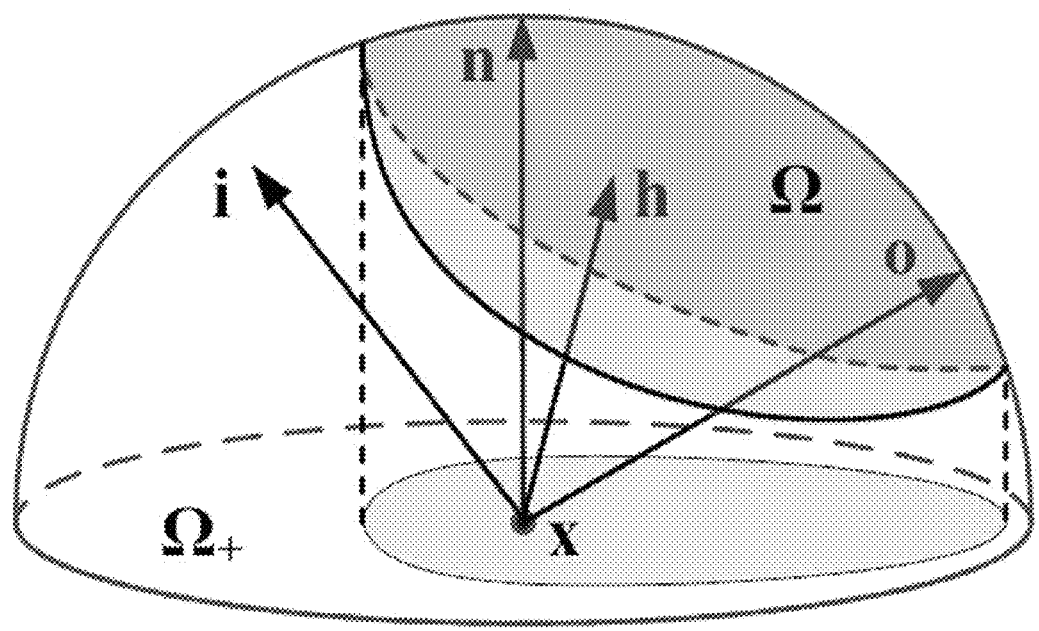
FIGS. 5 and 6 are representations of domains of a partial normal distribution function (NDF) for an illuminated point, including the partial NDF (FIG. 5) and its shadowing term (FIG. 6).

To perform the partial NDF fitting step, given a two-dimensional slice of specular BRDF data at each surface point, each surface point's NDF is computed independently. To avoid effects from the Fresnel term that is derived later, reflectance data near the grazing angle is excluded, assuming that F(x,i, o)=1. As shown in FIG. 5, with a fixed view direction o and light directions i over the whole hemisphere, the sampled half-angle reflectance directions cover only a sub-region W of the hemisphere:

$$\Omega = \left\{ \frac{i + o}{\| i + o \|} \mid i \in \Omega_+ \right\} = \{ h \mid refl(o, h) \cdot n > 0 \} \quad (10)$$

where $refl(o,h) = 2(h \cdot o)h - o$ reflects the unit vector o about h. Thus, the captured data specifies the NDF only partially, over $\Omega$.

Figure 6:
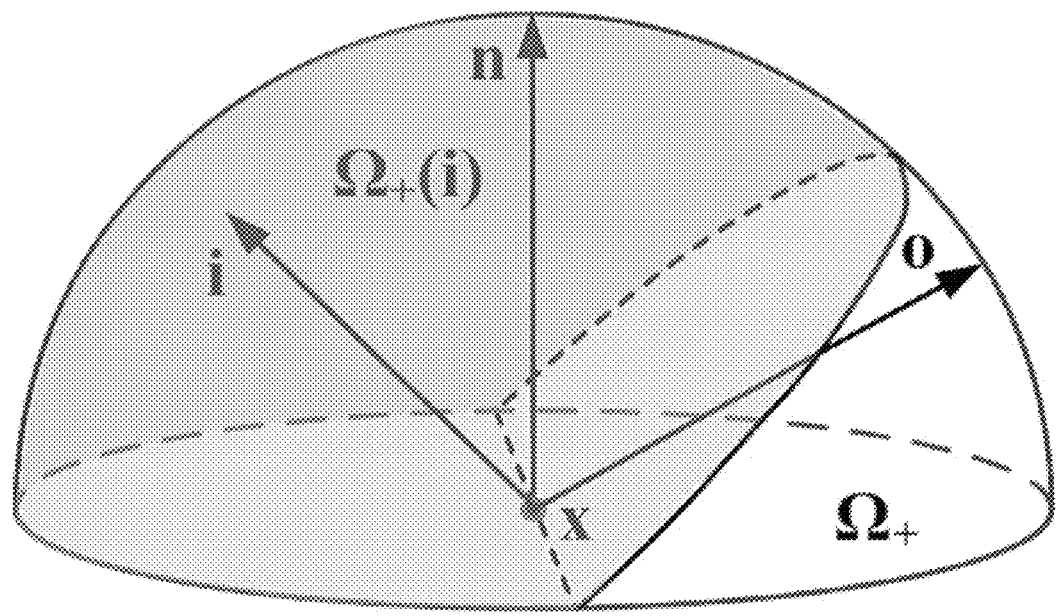

A straightforward solution for fitting this partial normal distribution function D(x,h) starts from constant shadow term S(x,k)=1; the partial NDF is computed as:

$$D(x, h) = \begin{cases} \dfrac{4\pi \tilde{\rho}_s x, o, i(h))(i(h) \cdot n)(o \cdot n)}{S(x, i(h)) S(x, o)}, & h \in \Omega \\ 0, & h \notin \Omega \end{cases} \quad (11)$$

where i(h)=refl(o,h). The shadowing term is then derived from the NDF using equation (5). This leads to a scheme that iteratively updates first D and then S until convergence. However, although this method fits the captured data well, it is biased, and does not accurately predict specular response at other views. More particularly, the problem arises because single-view data determines a partial NDF over $\Omega$ (FIG. 5), while the shadowing term requires the full NDF over $\Omega_+$ (FIG. 6). If D=0 is assumed outside $\Omega$ and used to estimate the shadowing term in equation (5), S is overestimated; after iterating, the NDF becomes biased.

To solve this problem, the process constrains S to its minimum value over all azimuthal angles via $S(x, i) = \min_{i'}\{S(x, i') | i' \cdot n = i \cdot n\}$. With this isotropically constrained S, the NDF is iteratively updated via equation (11) and its shadowing term via equation (5) until convergence, as in the straightforward method above. Note that the constrained shadowing term is only used to fit the partial NDF; the final S is derived from the completed NDF in the last step. Further, note that other schemes to extend the domain of D outside Ω in order to define S may be used, including projection to low-order spherical harmonics and push/pull.

To represent the partial NDF's domain Ω, a confidence function is defined via $$W(x, h) = \left[ (refl(o, h) \cdot n)^{\frac{1}{2}} \right]_+ \quad (12)$$

where $[\cdot]+$ denotes max$\{\cdot, 0\}$. W is positive for h within Ω, and gradually decreases to 0 at its boundary, and remains 0 outside it. Low confidence is assigned near the boundary of Ω where BRDF values tend to be extrapolated and dominated by the Fresnel term. The partial NDF $D(x,h)$ and its confidence function $W(x,h)$ are represented as a hemicube over h.

Note that it is possible to explicitly represent spatial variation in the set of light directions $i_q(x)$ and view direction $o(x)$, by using a spatially varying NDF domain $\Omega(x)$. This accounts for the finite lighting span and camera distance.

After recovering the partial NDF $D(x,h)$ at each surface point, synthesis (block 344 of FIG. 3 and step 412 of FIG. 4) completes the NDF using partial NDFs at other points. Note that on a sample surface, the process can find surface points having similar NDFs but different local frames; i.e., different azimuthal rotations around the normal. Thus, the captured data actually reveals different parts of the common NDF at such points. The process exploits this by finding rotated partial NDFs at other surface points that are similar within their shared half-space domain and merging them. Given the partial NDF tuple $\Psi(x)=\langle D(x,h),W(x,h)\rangle$ defined on each surface point, an exemplar set $\Psi^*$ is generated by rotating $\Psi(x)$ around the normal n by all possible azimuthal angles $\phi$:

$$\Psi^* = \{\Psi(x, \varphi)\} = \{\langle D^\varphi(x, h), W^\varphi(x, h)\rangle\} \quad (13)$$

$$= \{\langle D(x, R(\varphi)h), W(x, R(\varphi)h)\rangle | \varphi \in [0, 2\pi]\}$$

where $R(\phi)$ is the azimuthal rotation of $\phi$.

The process completes each point's partial NDF with iterative synthesis using logic as represented by the pseudo-code below:

---
NDFSynthesis($\Psi(x),\Psi^*$)
For each surface point x
  $\Psi_0(x) = \Psi(x)$
  While ($\Omega_i(x) < \Omega+$)
    $\Psi(x', \phi') = \text{BestMatch}(\Psi_i(x),\Psi^*)$
    $\Psi_{i+1}(x) = \text{Merge}(\Psi_i(x),\Psi(x', \phi'))$

---

For each surface point x, starting from the initial NDF tuple $\Psi(x)=\Psi(x)=\langle D(x,h),W(x,h)\rangle$, the process updates the NDF and its confidence function iteratively, yielding $\Psi i(x)=\langle D_i(x,h),W_i(x,h)\rangle$ at each iteration i. Each iteration extends the NDF domain incrementally in counter-clockwise order around the azimuth, as described below.

The update searches the exemplar set $\Psi^*$ to find a match of the current NDF tuple $\Psi_i(x)$, $\Psi(x', \phi')$, via $$(x', \varphi') = \underset{\tilde{x}, \tilde{\varphi}}{\text{argmin}}\{dist(\Psi_i(x), \Psi(\tilde{x}, \tilde{\varphi}))\} \quad (14)$$

The distance between two partial NDF tuples $\Psi_1=\langle D_1,W_1\rangle$ and $\Psi_2=\langle D_2,W_2\rangle$ is defined using the integral $$dist(\Psi_1, \Psi_2) = \frac{\int_{\Omega_\cap} \sqrt{W_1(h)W_2(h)} \left\| \frac{D_1(h)}{s_1} - \frac{D_2(h)}{s_2} \right\|^2 d\omega_h}{\int_{\Omega_\cap} \sqrt{W_1(h)W_2(h)} \, d\omega_h} \quad (15)$$

over their overlapping region
$\Omega_\cap = \{\Omega_1 \cap \Omega_2\} = \{h | W_1(h) W_2(h) > 0\}$.

The scalars $s_1$ and $s_2$ normalize the partial NDFs over the overlapped region and are defined as $s_k = \int_{\Omega_\cap} D_k(h) d\omega_h$ for k=1, 2.

To maintain synthesis quality, the process excludes candidates from the search set $\Psi^*$ whose partial domains overlap insufficiently with $\Psi_i(x)$. Also excluded are candidates that insufficiently extend $\Psi_i(x)$. In one implementation, candidates need to have between a fifty percent and eighty-five percent overlap with $\Psi_i(x)$. After determining the best match, the new NDF tuple $\Psi_{i+1}(x)$ is updated by merging in the optimal extension $\Psi(x',\phi')$ via $$D_{i+1}(x, h) = \frac{W_i(x, h)D_i(x, h) + \frac{s_1}{s_2}W^{\varphi'}(x', h)D^{\varphi'}(x', h)}{W_i(x, h) + W^{\varphi'}(x', h)}, \quad (16)$$

$$W_{i+1}(x, h) = \max\{W_i(x, h), W^{\varphi'}(x', h)\}. \quad (17)$$

Continuing with the new partial NDF tuples $\Psi_{i+1}(x)$ at each surface point, the above steps are repeated until each point's NDF covers the hemisphere. The NDF coverage $\Omega_i(x)$ after each iteration can be reconstructed from $W_i(x,h)$ via $\Omega_i(x) = \{h | W_i(x,h) > 0\}$. There may be small uncovered regions left in some NDFs after synthesis, which can be interpolated with the push-pull method. In general, NDFs are suitably completed after five to seven iterations.

Synthesis implementations may be prohibitively slow due to the expensive distance calculation in the candidate search and the large number of surface points. Two mechanisms are described herein to speed up synthesis, including NDF clustering (block 340 and step 336) and search pruning (block 340 and step 410).

NDF clustering reduces both the number of NDFs that need to be synthesized as well as searched. Because many surface points have similar reflectance and can be approximated well by a linear combination of a few representatives, expensive NDF completion may be performed on a smaller set of representatives, with a high-resolution result obtained by interpolating their completions. To find the set 337 of representatives, k-means clustering may be applied to the partial NDFs of the surface points. A representative in each cluster is selected that is closest to the cluster center where distance is computed according to equation (15). For example, the number of representatives may be one percent of the number of surface points. A large number of clusters ensures that each contains only samples that are similar.

Interpolation weights are then found on the partial data. Each (non-representative) partial NDF, $D(x_i,h)$, is approximated by linear interpolation on a set of neighbor representatives, $D(x_j^*, h)$, via $$D(x_i, h) = \sum_{j \in N_i} w_{ij} D(x_j^*, h) \quad (18)$$

where $j \in N_i$ indexes one of the neighbor representatives of $x_i$, and $w_{ij}$ are the interpolation coefficients. To determine the neighbor set $N_i$ for $x_i$, its k=16 nearest representatives are collected, excluding those whose distance is larger than $5\lambda$ where $\lambda$ is the smallest distance between two representative NDFs. The process then solves for the weights $w_{ij}$ in the linear equation system represented by equation (18), augmented by the single equation $\Sigma_{j \in N_i} w_{ij} = 1$. Note that k may be set to sixteen based on the observation that the intrinsic dimension of the BRDF space is roughly sixteen.

Figure 7:
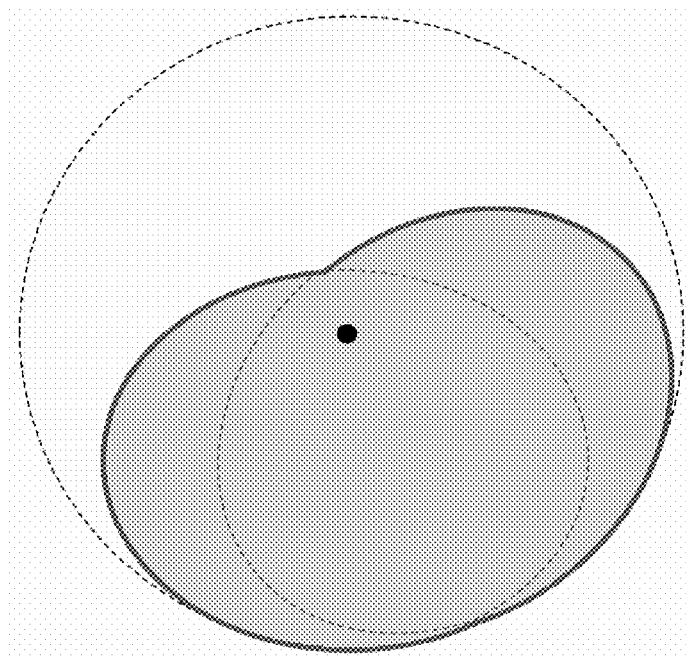
FIGS. 7-10 are representations of overlap regions that are approximated in search pruning to find search candidates for processing partial NDFs into completed NDFs.

The other acceleration mechanism, search pruning (block 340 and step 410), accelerates the search by pruning the set of candidates 339 into a reduced subset 341. Pruning is generally represented in FIGS. 7-10 which represents overlap region approximation. In general, FIG. 7 represents a current $\Psi_i(x)$, formed by an earlier merge of two partial NDFs.

Figure 8:
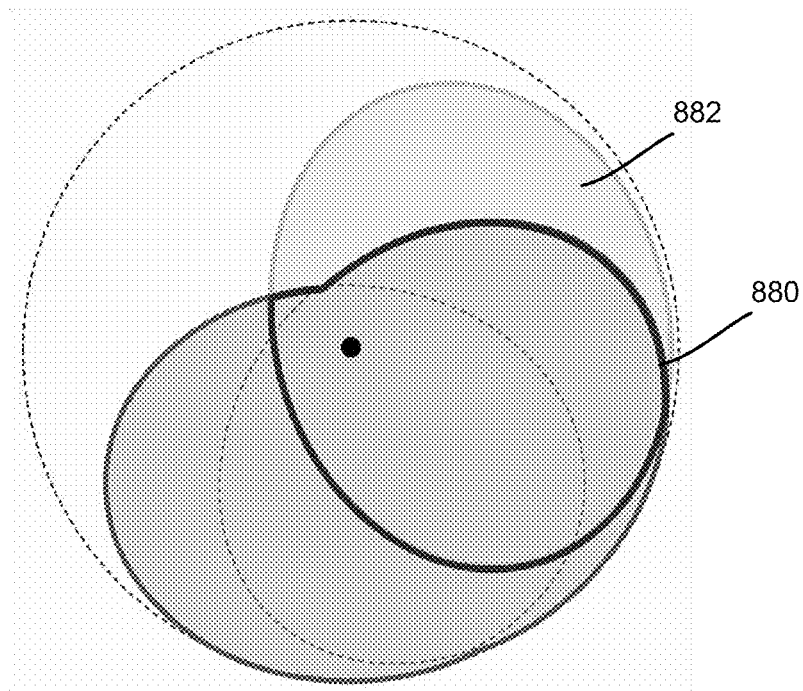
Figure 9:
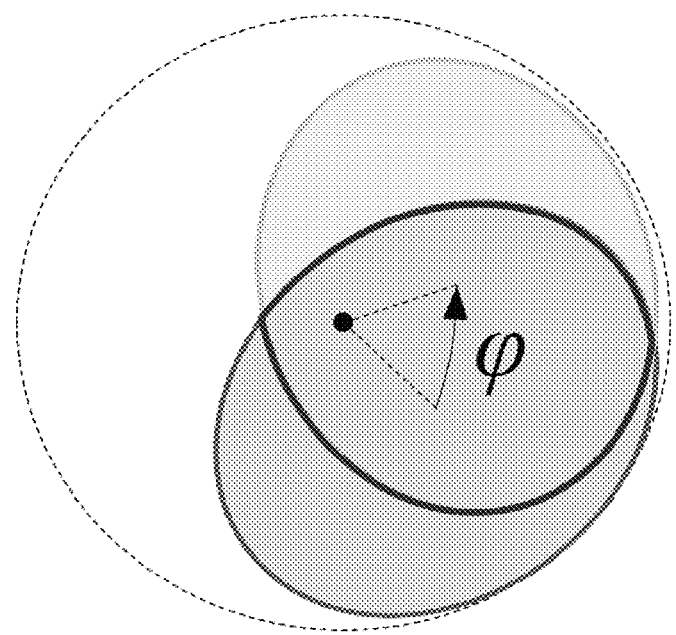
Figure 10:
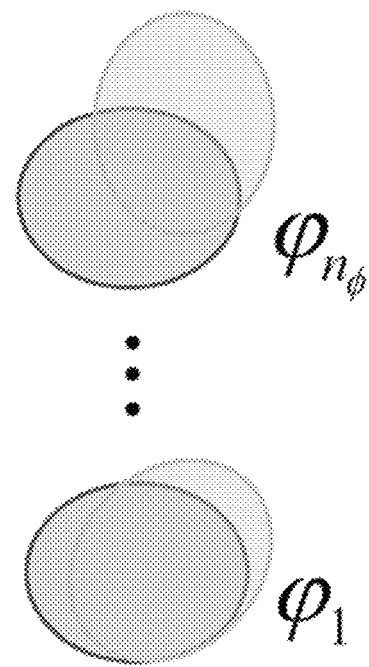

Initially, the region $\Psi_i(x)$ is extended differently at each point and each iteration, depending on which candidate is selected for the merge. The overlap region therefore cannot be predetermined. However, as shown in FIG. 8 which represents the overlap region $\Omega_\cap$ (enclosed by the dark line 880) of $\Psi_i(x)$ and a candidate 882, as the NDF domain extends azimuthally, the overlap region is mostly determined by the last merged candidate and the current candidate. Therefore, the overlap region can be represented as the intersection of $\Omega$ with a rotated version of itself, $\Omega(\phi) = \Omega \cap R(\phi)\Omega$, as generally represented in FIG. 9. Because the candidates have a fifty to eighty five percent overlap with $\Psi_i(x)$, $\phi$ need only be chosen in a limited range which may be uniformly sampled using $n_\phi = 20$ angles. The result is a set of regions $\{\Omega(\phi_i) | i=1, 2, \ldots, n_\phi\}$ as shown in FIG. 10, that is, a range of rotations, $\phi_i$, are uniformly sampled to get a discrete set of overlap regions used for search pruning. Within each $\Omega(\phi_i)$, the histogram of $D(x,h)$ is computed at each surface point x using m=32 buckets over D's range [0,1]. The resulting 32 dimensional vector is used as a search key to find merge candidates that are similar within the region of overlap. To accelerate this search, an ANN tree of the histogram vectors may be pre-computed before synthesis; a separate tree is built for each $\phi_i$.

During synthesis, for each $\phi_i$, the process computes the histogram of the current region $\Psi_i(x)$ over $\Omega(\phi_i)$. The corresponding ANN tree quickly finds the five best matches in terms of $L^2$ distance in histogram space. For each match, gradient descent obtains the optimal $\phi'$ by minimizing equation (14) using the distance computation in equation (15). The minimal error match over all $\phi$ is then selected to merge. In a final iteration, the overlaps between the first as well as the last merged domain are considered because azimuthal rotation is periodic. The process performs the ANN search over both these domains to form a larger candidate set before applying the $\phi$ optimization.

To estimating the remaining parameters, the specular coefficient is computed given the completed NDF D via $k_s(x) = \int_{\Omega_+} (n \cdot h) D(x,h) d\omega_h$. The NDF is normalized by $D(x,h)/k_s(x)$ and use it to compute the shadowing term from equation (5).

The relative refraction index h(x) at each surface point is estimated by minimizing $$E(\eta(x)) = \int_{\Omega_+} \|F_c(i,o,\eta(x)) - F_m(x,i,o)\|^2 d\omega \quad (19)$$

where $F_c(i,o,\eta(x))$ is computed according to equation (3), and $F_m(x,i,o)$ is computed from the measured rs(x,o,i) as $$F_m(x, i, o) = \frac{4\pi \rho_s(x, o, i)(i \cdot n)(o \cdot n)}{S(x, i)S(x, o)k_s(x)D(x, h)}. \quad (20)$$

The process solves for $\eta(x)$ with the Levenberg-Marquardt algorithm.

As can be seen, the above process models the BRDF as a tabular microfacet normal distribution function that is spatially variant, and is independent of any particular surface. The visual modeling of spatially varying anisotropic reflectance may be obtained using data captured from a single view. By synthesizing the partial NDF fitted at each different surface point using similar, overlapping partial NDFs from other points, the process captures angular variation without decreasing spatial resolution. Reflectance is represented using a microfacet-based BRDF which tabulates the facets' normal distribution (NDF) as a function of surface location.

Exemplary Operating Environment

Figure 11:
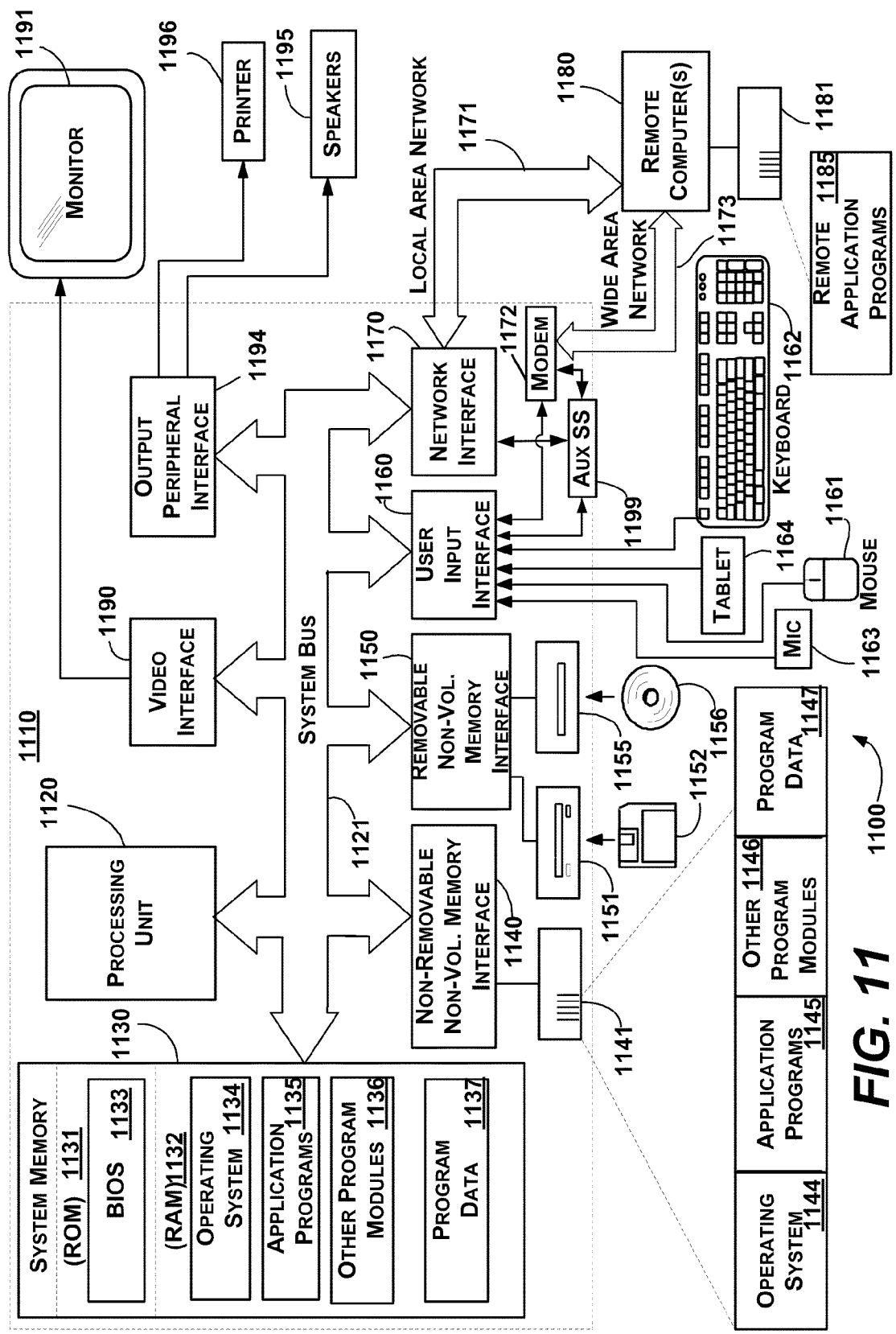
FIG. 11 shows an illustrative example of a computing environment into which various aspects of the present invention may be incorporated.

FIG. 11 illustrates an example of a suitable computing and networking environment 1100 on which the examples of FIGS. 1-10 may be implemented, such as to output the query results with integrated query suggestions. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 11, an exemplary system for implementing various aspects of the invention may include a general purpose computing device in the form of a computer 1110. Components of the computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer-readable media. Computer-readable media can be any available media that can be accessed by the computer 1110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136 and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media, described above and illustrated in FIG. 11, provide storage of computer-readable instructions, data structures, program modules and other data for the computer 1110. In FIG. 11, for example, hard disk drive 1141 is illustrated as storing operating system 1144, application programs 1145, other program modules 1146 and program data 1147. Note that these components can either be the same as or different from operating system 1134, application programs 1135, other program modules 1136, and program data 1137. Operating system 1144, application programs 1145, other program modules 1146, and program data 1147 are given different numbers herein to illustrate that, at a minimum, they are different copies. A user may enter commands and information into the computer 1110 through input devices such as a tablet, or electronic digitizer, 1164, a microphone 1163, a keyboard 1162 and pointing device 1161, commonly referred to as mouse, trackball or touch pad. Other input devices not shown in FIG. 11 may include a joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. The monitor 1191 may also be integrated with a touch-screen panel or the like. Note that the monitor and/or touch screen panel can be physically coupled to a housing in which the computing device 1110 is incorporated, such as in a tablet-type personal computer. In addition, computers such as the computing device 1110 may also include other peripheral output devices such as speakers 1195 and printer 1196, which may be connected through an output peripheral interface 1194 or the like.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include one or more local area networks (LAN) 1171 and one or more wide area networks (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160 or other appropriate mechanism. A wireless networking component 1174 such as comprising an interface and antenna may be coupled through a suitable device such as an access point or peer computer to a WAN or LAN. In a networked environment, program modules depicted relative to the computer 1110, or portions thereof, may be stored in the remote memory storage device. By way of example, and not limitation, FIG. 11 illustrates remote application programs 1185 as residing on memory device 1181. It may be appreciated that the network connections shown are exemplary and other means of establishing a communications link between the computers may be used.

An auxiliary subsystem 1199 (e.g., for auxiliary display of content) may be connected via the user interface 1160 to allow data such as program content, system status and event notifications to be provided to the user, even if the main portions of the computer system are in a low power state. The auxiliary subsystem 1199 may be connected to the modem 1172 and/or network interface 1170 to allow communication between these systems while the main processing unit 1120 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising, processing a set of images associated with a sample surface into partial normal distribution functions corresponding to points of the sample surface, each image captured from a different illumination position with respect to illuminating the sample surface, completing the partial normal distribution functions into completed normal distribution functions for at least some selected partial normal distribution functions corresponding to at least some selected points of the sample surface, including by synthesizing each partial normal distribution corresponding to a different selected point using overlapping partial normal distribution functions of other points of the sample surface, and using the completed normal distribution functions to obtain bidirectional reflectance distribution functions representing reflectance information at a plurality of points of the sample surface.

2. The method of claim 1 further comprising, performing clustering to select which partial normal distribution functions to complete.

3. The method of claim 1 wherein for each selected partial normal distribution function, the other partial normal distribution functions correspond to a set of search candidates, and further comprising, pruning the search candidates into a smaller subset of search candidates.

4. The method of claim 1 wherein for each selected partial normal distribution function, the other partial normal distribution functions correspond to a search space, and further comprising, pruning the search space based upon how much the partial normal distribution function domains overlap, and how similar the normal distribution functions are over that overlapping domain.

5. The method of claim 1 wherein for each selected partial normal distribution function, the other partial normal distribution functions correspond to a search space, and further comprising, extending the search space using synthesis operations on initially measured data of the normal distribution functions.

6. The method of claim 1 wherein using the completed normal distribution functions to obtain the bidirectional reflectance distribution functions further comprises normalizing each completed normal distribution function.

7. The method of claim 1 wherein using the completed normal distribution functions to obtain the bidirectional reflectance distribution functions further comprises computing a shadowing term for each selected point based upon the completed normal distribution function corresponding to that point.

8. The method of claim 5 further comprising estimating a relative refraction index for each selected point.

9. The method of claim 1 further comprising, changing each illumination position to a different illumination position by: (a) setting a linear array of light sources at a start position; (b) individually illuminating light sources of the linear array; (c) moving the linear array towards a stop position in a direction that is substantially perpendicular to the linear array; and (d) repeating from step (b) until the stop position is reached.

10. The method of claim 1 further comprising, capturing the images corresponding to the different illumination positions with a single camera that is fixed with respect to the different illumination positions.

11. The method of claim 1 further comprising, outputting spatially varying bidirectional reflectance distribution functions corresponding to the bidirectional reflectance distribution functions for use in rendering computer graphics.

12. In a computing environment, a system comprising, a scan mechanism configured to illuminate a sample surface from a plurality of illumination positions in two dimensions via a set of individually illuminated light sources, the scan mechanism coupled to a camera that is configured to capture, from at least one fixed view direction, a set of images corresponding to the illumination positions, the illumination positions comprise positions where the set of individually illuminated light sources does not occlude the camera, the images provide overlapping partial normal distribution functions that are processed into normal distribution functions for selected points of the sample surface to determine a bidirectional reflectance distribution function at each selected point, the overlapping partial normal distribution functions corresponding to other points of the sample surface.

13. The system of claim 12 wherein the set of individually illuminated light sources scan mechanism comprises a linear array of LEDs.

14. The system of claim 13 wherein the scan mechanism comprises a motor configured to move the linear array of LEDs in a direction that is perpendicular to the linear array.

15. The system of claim 14 wherein the motor is further configured to move the linear array towards or away from the camera.

16. The system of claim 12 wherein the modeling process is configured to compute the normal distribution function for each selected point based upon the partial normal distribution function corresponding to that point and other partial normal distribution functions corresponding to other points.

17. The system of claim 12 wherein the modeling process includes a clustering mechanism by which the selected points are selected.

18. One or more computer-readable storage media having computer-executable instructions not consisting of a signal, which when executed perform steps, comprising:
processing a set of images associated with a sample surface into partial normal distribution functions corresponding to points of the sample surface, each image being captured from a single viewing direction with respect to a different illumination position for illuminating the sample surface, including changing to the different illumination position by, (a) setting a linear array of light sources at a start position, (b) individually illuminating light sources of the linear array, (c) moving the linear array towards a stop position, and (d) repeating from step (b) until the stop position is reached;
modifying reflectance data associated with a grazing angle;
selecting a set of partial normal distribution functions, each selected partial normal distribution function corresponding to a selected point of the sample surface;
and for each selected partial normal distribution function, choosing search candidates corresponding to other partial normal distribution functions of other points of the sample surface, and completing that partial normal distribution function into a completed normal distribution function by applying a texture synthesis using the search candidates.

19. The one or more computer-readable storage media of claim 18 having further computer-executable instructions comprising, using the completed normal distribution functions to obtain bidirectional reflectance distribution functions, including, for each selected point, computing a specular coefficient based upon the completed normal distribution function, computing a shadowing term based upon the completed normal distribution function corresponding to that point, and estimating a relative refraction index.

20. The one or more computer-readable storage media of claim 18 having further computer-executable instructions comprising, synthesizing each partial normal distribution corresponding to a different selected point using overlapping partial normal distribution functions of the other points of the sample surface, and using the completed normal distribution functions to obtain bidirectional reflectance distribution functions representing reflectance information at a plurality of points of the sample surface.

\* \* \* \* \*